(12) United States Patent
Liao (10) Patent No.: US 7,490,970 B2
(45) Date of Patent: Feb. 17, 2009

(54) LIGHT GUIDE PLATE WITH HIGH-DENSITY DIFFERENTLY SIZED DIFFUSING DOTS AND BACKLIGHT MODULE USING THE SAME

(75) Inventor: Ming-Yi Liao, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 31 days.

(21) Appl. No.: 11/620,945

(22) Filed: Jan. 8, 2007

(65) Prior Publication Data

US 2008/0068863 A1    Mar. 20, 2008

(30) Foreign Application Priority Data

Sep. 15, 2006    (CN) .................... 2006 0 0062682

(51) Int. Cl.
*F21V 7/04* (2006.01)
(52) U.S. Cl. .................... 362/624; 362/623; 362/627
(58) Field of Classification Search ................. 362/614, 362/615, 623, 624, 625, 627; 349/65
See application file for complete search history.

(56) References Cited

U.S. PATENT DOCUMENTS

| 5,134,549 | A | * | 7/1992 | Yokoyama | .................. 362/623 |
| 5,751,386 | A | * | 5/1998 | Kanda et al. | .................. 349/65 |
| 5,921,651 | A | * | 7/1999 | Ishikawa | .................... 362/624 |
| 5,931,555 | A | * | 8/1999 | Akahane et al. | ............. 362/623 |

* cited by examiner

*Primary Examiner*—Y My Quach Lee
(74) *Attorney, Agent, or Firm*—Steven M. Reiss (57) ABSTRACT

An exemplary light guide plate includes a light input surface, a bottom surface, a light output surface opposite to the bottom surface, and a plurality of dots. The dots are arranged on the bottom surface in series of adjacent columns parallel to the light input surface. Each dot column defines a column axis that passes through centers of the dots. A distance between two adjacent column axes increases with increasing distance from the first light input surface. A distance between centers of two adjacent dots in the same column increase with increasing distance from a center of the column to each of two opposite ends of the column. A backlight module using the light guide plate is also provided.

19 Claims, 7 Drawing Sheets

LIGHT GUIDE PLATE WITH HIGH-DENSITY DIFFERENTLY SIZED DIFFUSING DOTS AND BACKLIGHT MODULE USING THE SAME

CROSS-REFERENCE TO RELATED APPLICATIONS

This application is related to a U.S. patent application Ser. No. 11/617,615 entitled "LIGHT GUIDE PLATE WITH HIGH-DENSITY DIFFUSING DOTS AND BACKLIGHT MODULE USING THE SAME", recently filed with the same assignee as the instant application. The disclosure of the above identified application is incorporated herein by reference.

BACKGROUND OF THE INVENTION

1. Field of the Invention

The present invention relates to light guide plates and backlight modules typically used in liquid crystal displays, and particularly to a light guide plate having high-density diffusing dots.

2. Discussion of the Related Art

Backlight modules are used in liquid crystal display devices for converting linear light sources (such as cold cathode ray tubes) or point light sources (such as light emitting diodes) into surface light sources having high uniformity and brightness.

A typical backlight module includes a light source, a light guide plate, a reflection plate, a diffusion plate, and a prism sheet. The light source can be located beside an end of the light guide plate or beside two opposite ends of the light guide plate. The light source is used to emit incident light rays into the light guide plate. The light guide plate is used to guide incident light rays to efficiently exit a top emission surface of the light guide plate. The reflection plate is located below a bottom surface of the light guide plate, and is used to reflect some of the incident light rays that escape from the bottom surface back into the light guide plate. This reflection enhances the utilization ratio of the incident light rays. The diffusion plate and the prism sheet are located on the emission surface of the light guide plate in that order, and are used to improve uniformity and brightness of the emitted light rays.

Figure 5:
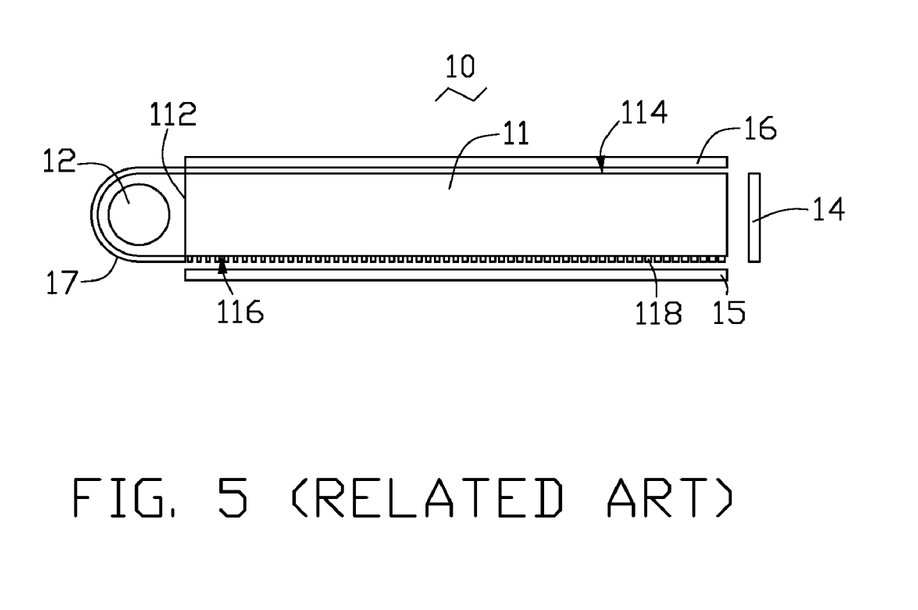
FIG. 5 is a side view of a conventional backlight module including a light guide plate and a light source.

FIG. 5 shows one example of the above-described kind of backlight module. The backlight module 10 includes a light guide plate 11, a light source 12, a side reflection sheet 14, a light diffusion layer 16, a bottom reflection sheet 15, and a curved reflection plate 17. The light guide plate 11 includes a light input surface 112, a light output surface 114 adjoining the light input surface 112, and a bottom surface 116 opposite to the light output surface 114. The light source 12 is positioned adjacent to the light input surface 112. The side reflection sheet 14 is provided on a side surface (not labeled) of the light guide plate 11 that is opposite to the light input surface 112. The light diffusion layer 16 is disposed on the light output surface 114, and the bottom reflection sheet 15 is disposed on the bottom surface 116. The curved reflection plate 17 is provided to substantially enclose the light source 12 so as to efficiently utilize light rays emitted by the light source 12.

Furthermore, a plurality of dots 118 configured for light diffusion/transmission is provided on the bottom surface 116 of the light guide plate 11. The dots 118 are formed by means of, for example, gravure printing, offset printing, screen printing and/or transfer printing. The dots 118 can have any of various predetermined shapes, such as round, square, or polygonal. The dots 118 are used to break up what would otherwise be total reflection of light rays incident at the bottom surface 116. This light diffusion helps ensure that the light rays exit an entire expanse of the light output surface 114 of the light guide plate 11 uniformly.

Figure 6:
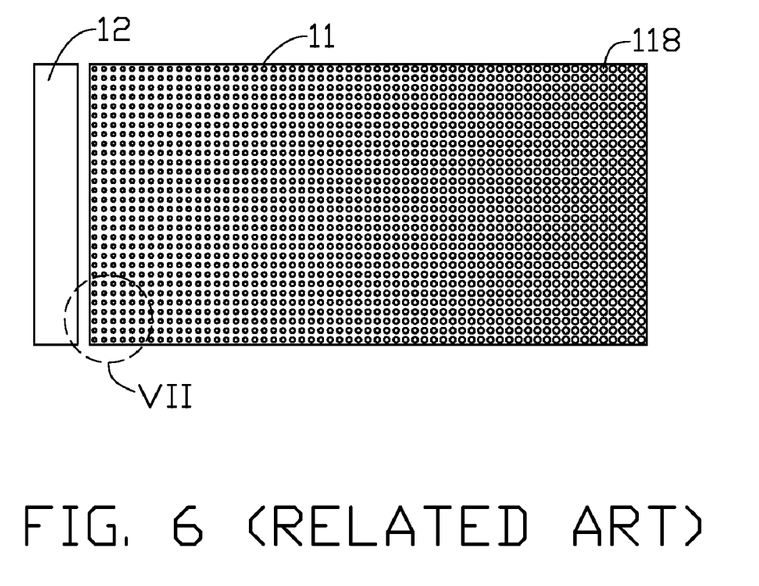
FIG. 6 is a plan view of a bottom surface of the light guide plate of FIG. 5.
Figure 7:
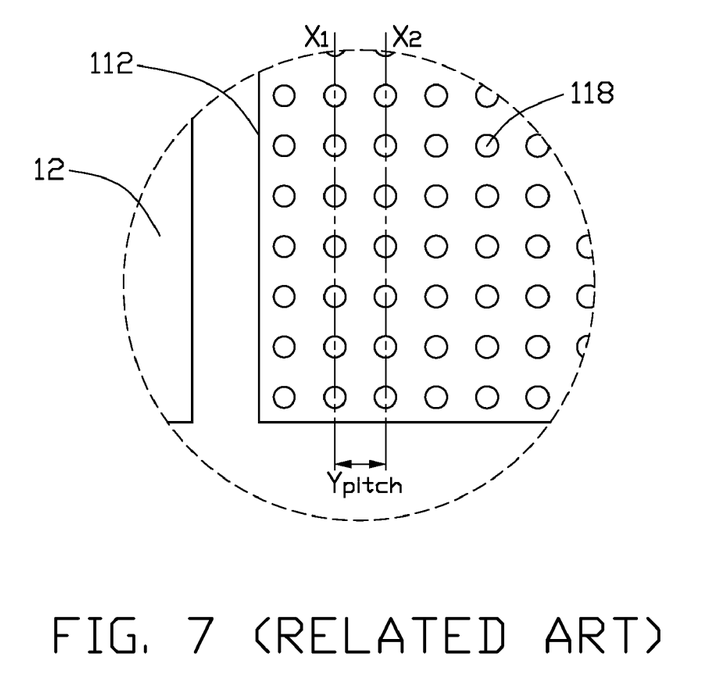
FIG. 7 is an enlarged view of a circled portion VII of FIG. 6.

Referring to FIG. 6, a distribution of the dots 118 on the bottom surface 116 of the light guide plate 11 is shown. The dots 118 are arranged on the bottom surface 116 in a matrix, which includes a series of adjacent columns of dots 118 parallel to the light input surface 112. In a same column, a distance between the centers of two adjacent dots 118 is uniform. Each column defines a column axis that passes through the centers of the dots 118. A distance between the column axes of each two adjacent columns is uniform. For example, referring to FIG. 7, a distance $Y_{pitch}$ between two adjacent column axes $X_1$ and $X_2$ is constant. Sizes of the dots 118 gradually increase with an increase in distance from the light input surface 112 along a first direction. The first direction is perpendicular to the light input surface 112 and parallel to the light output surface 114.

The dots 118 can, to a certain extent, enhance the uniformity of the light rays emitted from the light guide plate 11. Sizes of the dots 118 near the light input surface 112 are relatively small, to compensate for the close proximity of the dots 118 to the light input surface 112. Thus a clearance between adjacent columns near the light input surface 112 is relatively large. This means relatively large areas of the bottom surface 116 corresponding to the clearances are not used for light diffusion. In this respect, the dots 118 near the light input surface 112 do not provide efficient dispersal of light rays incident at that part of the bottom surface 116. Thus, it is difficult for the light guide plate 11 to achieve a high level of uniformity of light rays emitted from the light output surface 114. Furthermore, clearances between adjacent rows of dots are substantially straight, and this tends to produce bright lines in the output light. For these reasons, the light guide plate 11 cannot necessarily provide the backlight module 10 with optimal quality of output light.

What is needed, therefore, is a light guide plate and backlight module using the light guide plate that overcome the above mentioned disadvantages.

SUMMARY

In one aspect, a light guide plate according to a preferred embodiment includes a light input surface, a bottom surface, a light output surface, and a plurality of dots. The bottom surface is adjacent the light input surface. The light output surface is opposite to the bottom surface. The dots are arranged at the bottom surface in series of adjacent columns parallel to the light input surface. Each column defines a column axis that passes through centers of the dots in that column. A distance between two adjacent column axes increases with increasing distance from the first light input surface. Sizes of the dots increase with increasing distance of the columns from the first light input surface. A distance between centers of two adjacent dots in a same column increase with increasing distance from a center of the column to each of two opposite ends of the column. Sizes of the dots in a same column increase with increasing distance from the center of the column to each of the two opposite ends of the column.

In another aspect, a backlight module according to a preferred embodiment includes a light guide plate and a light source. The same light guide plate as described in the previous paragraph is employed in this embodiment. The light source is disposed adjacent to the light input surface of the light guide plate.

Other advantages and novel features will become more apparent from the following detailed description of various embodiments, when taken in conjunction with the accompanying drawings.

BRIEF DESCRIPTION OF THE DRAWINGS

The components in the drawings are not necessarily drawn to scale, the emphasis instead being placed upon clearly illustrating the principles of the present light guide plate and related backlight module. Moreover, in the drawings, like reference numerals designate corresponding parts throughout the several views, and all the views are schematic.

DETAILED DESCRIPTION OF THE PREFERRED EMBODIMENTS

Reference will now be made to the drawings to describe preferred embodiments of the present light guide plate and backlight module in detail.

Figure 1:
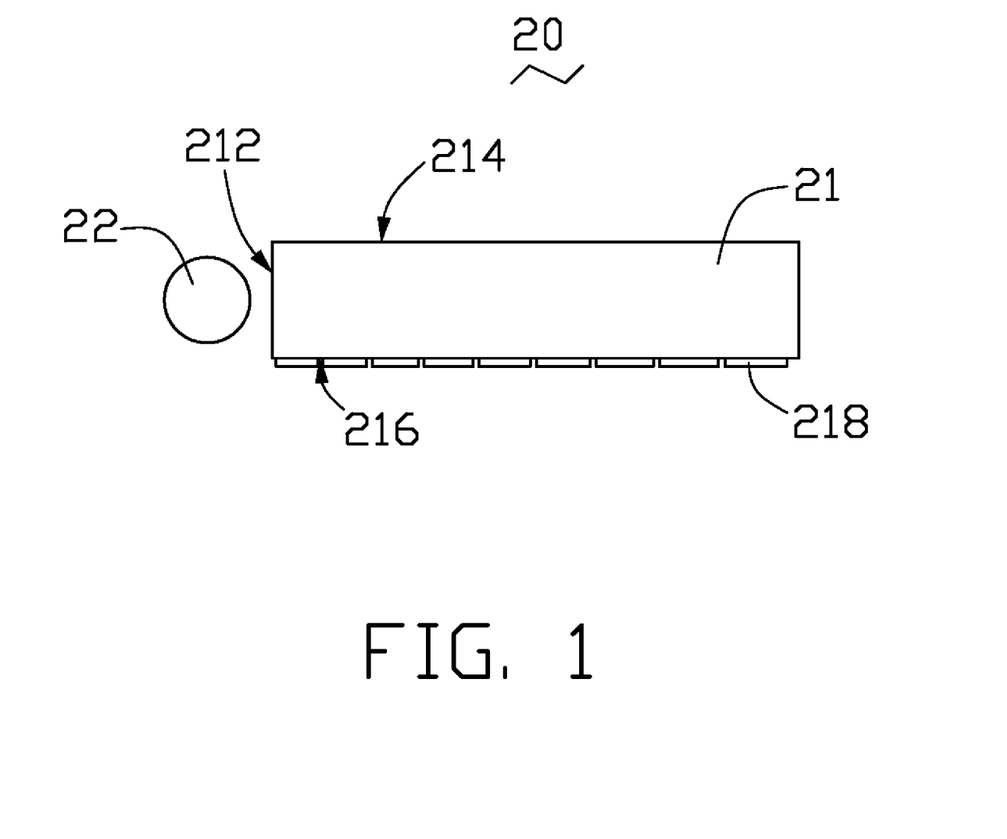
FIG. 1 is a side view of a backlight module according to a first preferred embodiment of the present invention, the backlight module including a light source and a light guide plate.

Referring to FIG. 1, a backlight module 20 in accordance with a first preferred embodiment is shown. The backlight module 20 includes a light guide plate 21 and a light source 22. The light guide plate 21 is a rectangular sheet having a uniform thickness, or alternatively may be generally cuneiform. The light guide plate 21 includes a light input surface 212, a light output surface 214 adjacent to the light input surface 212, a bottom surface 216 opposite to the light output surface 214, and an arrangement of dots 218 formed on the bottom surface 216. The light source 22 is positioned adjacent to the light input surface 212. A material of the light guide plate 21 is preferably selected from the group consisting of polymethyl methacrylate (PMMA), polycarbonate (PC), and other suitable transparent resin materials. In this embodiment, the light guide plate 21 is made of PMMA, and the light source 22 is a cold cathode fluorescent lamp.

Figure 2:
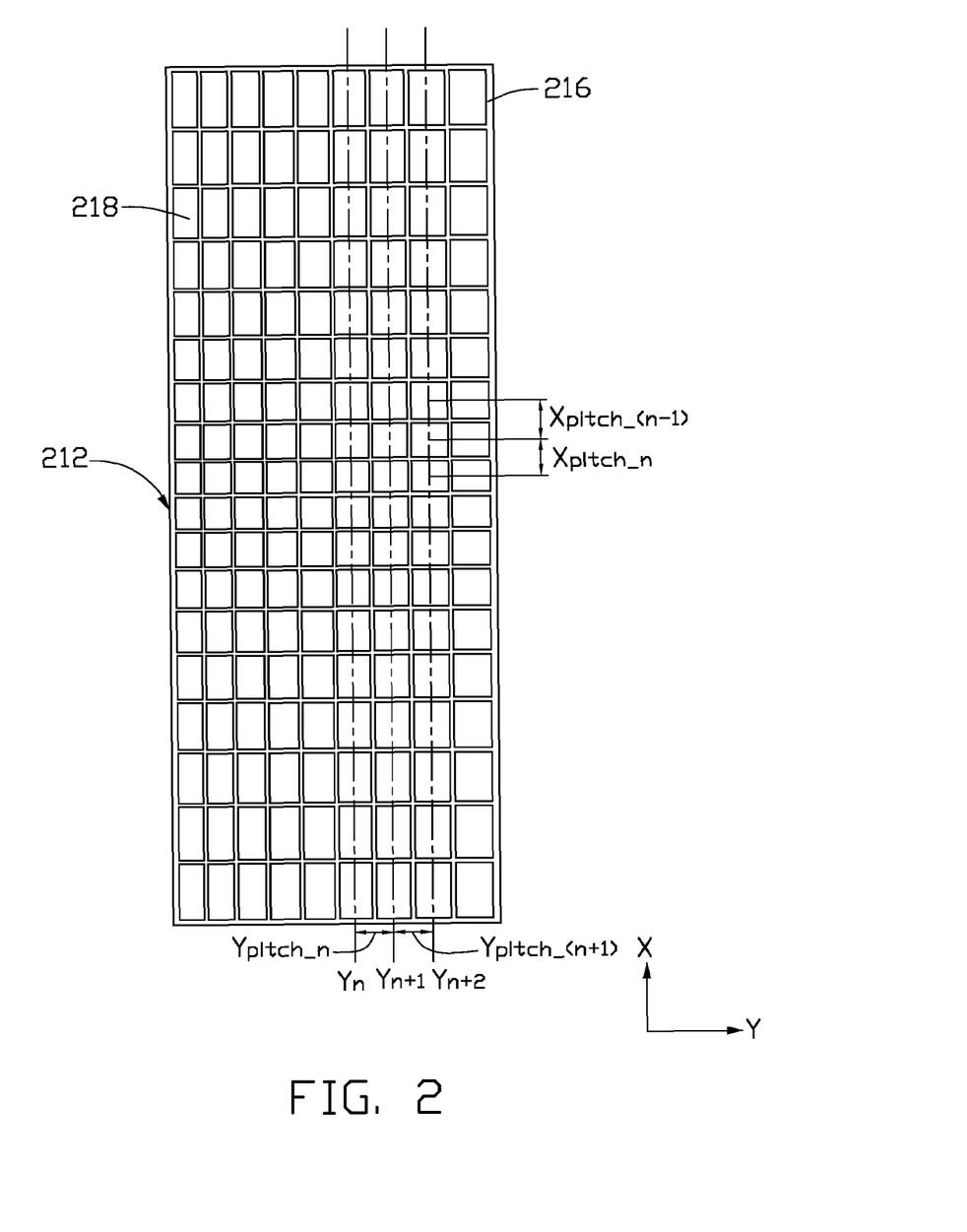
FIG. 2 is a plan view of a bottom surface of the light guide plate of FIG. 1.

Referring also to FIG. 2, an arrangement of the dots 218 on the bottom surface 216 of the light guide plate 21 is shown. The dots 218 are used to diffuse light incident thereon. The dots 218 are arranged in a series of adjacent columns, all of which are parallel to the light input surface 212. Each column contains a line of adjacent dots 218. The dots 218 are rectangular when viewed from directly below. Each column defines a column axis $Y_n$ ($Y_{n+1}$, $Y_{n+2}$, . . . and so on), which passes through centers of the dots 218 in that column. Furthermore, the distance $Y_{pitch\_n}$ ($Y_{pitch\_(n+1)}$, . . . and so on) between two adjacent column axes progressively increases with increasing distance from a leftmost column nearest the light input surface 212 to a rightmost column furthest from the light input surface 212. Correspondingly, the width of the dots 218 in each column progressively increases with increasing distance of the columns from the leftmost column nearest the light input surface 212 to the rightmost column furthest from the light input surface 212. Moreover, a distance $X_{pitch\_n}$ ($X_{pitch\_(n-1)}$, . . . and so on) between centers of two adjacent dots 218 in a same column progressively increases with increasing distance from a center of the column to each of two opposite ends of the column. Correspondingly, sizes (heights) of the dots 218 in a same column progressively increase with increasing distance from the center of the column to each of the two opposite ends of the column.

An area of the dots 218 when viewed from directly below is preferably in the range from about $1 \times 10^{-7}$ square millimeters to about $1 \times 10^{-4}$ square millimeters. The array of the dots 218 are manufactured by printing or chemical etching with a pattern mask. If the dots 218 are manufactured by printing, a material of the dots 218 can be selected from the group consisting of printing ink or a suitable modified printing ink. The modified printing ink is formed by uniformly dispersing a plurality of scattering particles into a printing ink matrix material. If the dots 218 are manufactured by chemical etching, the dots 218 can be configured to be micro-scattering structures etched on the bottom surface 216. The dots 218 can be either depressions or protrusions.

In summary, the distance $Y_{pitch}$ between adjacent column axes $Y_n$ is configured to vary according to varying distances of the columns from the light input surface 212, and the dots 218 in each same column are arranged closely together. Therefore, even though the dots 218 in columns near the light input surface 212 are relatively small, a clearance between adjacent columns near the light input surface 212 can be configured to be very small. Thus a great majority of the bottom surface 216 is used for light diffusion, and the dots 218 near the light input surface 212 provide efficient dispersal of light rays incident at that part of the bottom surface 216. Furthermore, sizes of the dots 218 and the distance $X_{pitch}$ between two adjacent dots 218 in a same column are configured to vary according to varying distances from a center of the column to two opposite ends of the column. Therefore, a clearance between adjacent dots 218 in each column can be configured to be very small. For these reasons, the light guide plate 21 can provide high quality output light.

Figure 3:
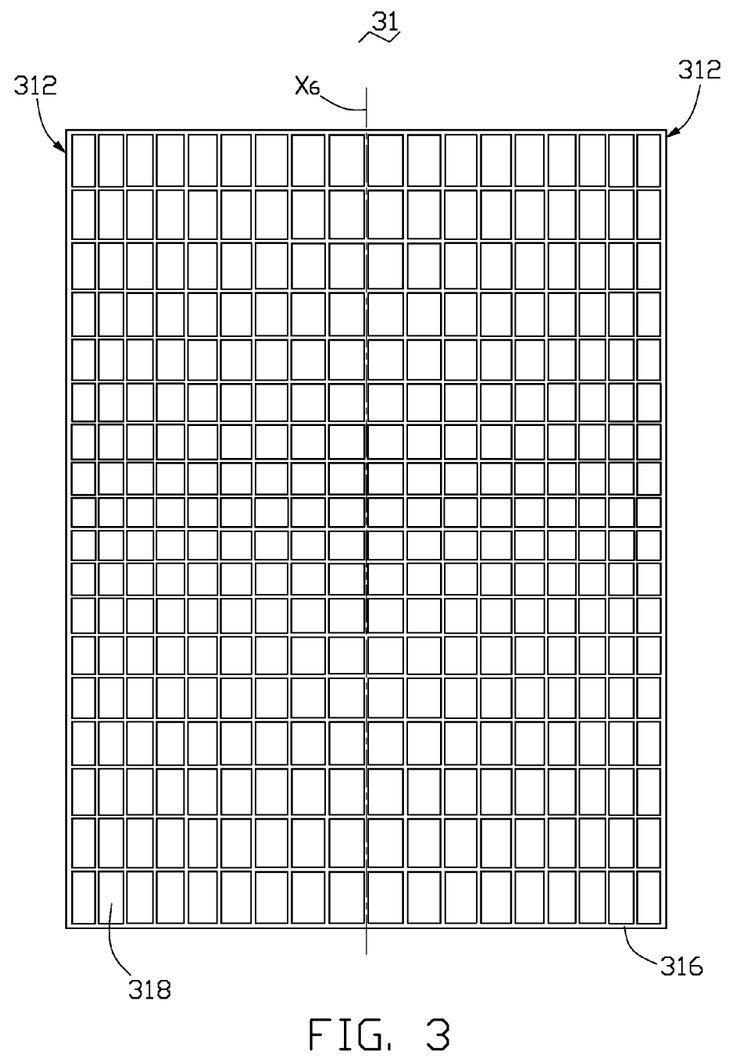
FIG. 3 is a bottom view of a light guide plate according to a second preferred embodiment of the present invention.

Referring to FIG. 3, a light guide plate 31 in accordance with a second preferred embodiment is similar in principle to the light guide plate 21. However, the light guide plate 31 includes two light input surfaces 312 at two opposite sides thereof respectively. In this embodiment, the bottom surface 316 defines a center axis $X_6$ between the two light input surfaces 312. Sizes of the dots 318 progressively increase with increasing distance of the columns from a first one of the light input surfaces 312 to the center axis $X_6$. Sizes of the dots 318 progressively increase with increasing distance of the columns from the second one of the light input surfaces 312 to the center axis $X_6$. A distance between two adjacent column axes progressively increases with increasing distance from the first light input surface 312 to the center axis $X_6$, and a distance between two adjacent column axes progressively increases with increasing distance from the second light input surface 312 to the center axis $X_6$. A distance between centers of two adjacent dots 318 in a same column progressively increases with increasing distance from a center of the column to two opposite ends of the column. Correspondingly, sizes of the dots 318 in a same column progressively increase with increasing distance from the center of the column to the two opposite ends of the column.

The light guide plate 31 can be assembled with two light sources (not shown) to form a backlight module. The two light sources are disposed adjacent to the two light input surfaces 312 of the light guide plate 31 respectively. It is to be understood that if the light sources output different levels of brightness, any suitable axis (not shown) between the two light input surfaces 312 can be defined instead of the center axis $X_6$.

Figure 4:
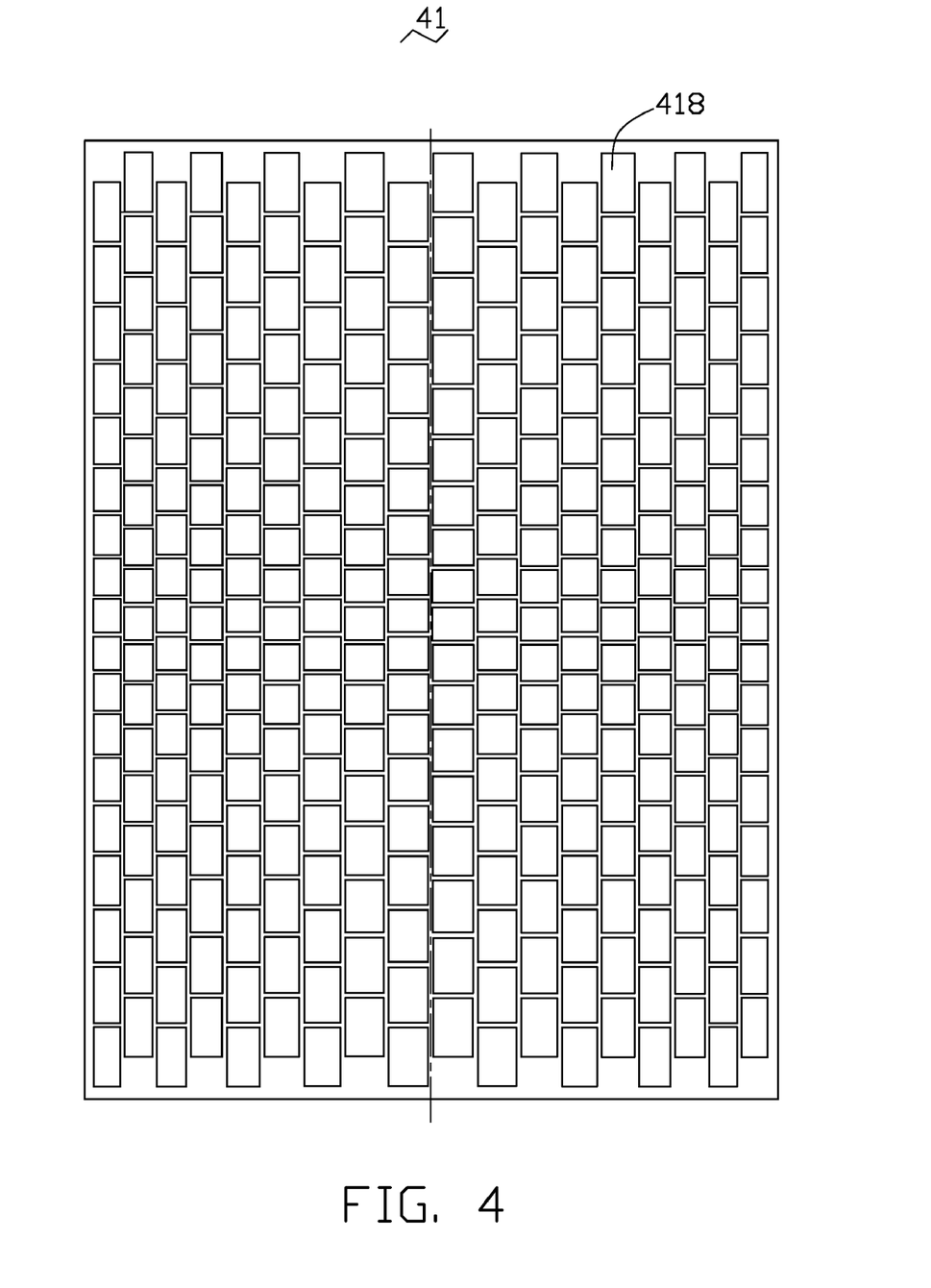
FIG. 4 is a bottom view of a light guide plate according to a third preferred embodiment of the present invention.

Referring to FIG. 4, a light guide plate 41 in accordance with a third preferred embodiment is similar in principle to the light guide plate 31. However, each of dots 418 in each column is offset relative to the adjacent dots 418 in each of the adjacent columns. That is, the dots 418 in each column are staggered relative to the dots 418 in each of the adjacent columns. This means, unlike in the above-described conventional light guide plate 11, there are no straight clearances between adjacent rows of dots; and therefore there are no corresponding bright lines in the output light.

The light source of the present backlight module can be selected from the group consisting of at least one light emitting diode and at least one cold cathode fluorescent lamp. For example, the backlight module may employ a plurality of light emitting diodes as the light source. It is noted that in alternative embodiments, the dots 218, 318, 418 of the light guide plates 21, 31, 41 can have any of various other suitable shapes. For example, when viewed from directly below, the shape can be round, elliptical, or polygonal. It is also noted that in alternative embodiments, a shape of the light guide plate may be rectangular or cuneiform sheet.

Finally, while particular embodiments have been described above, the description is illustrative of principles of the invention and is not to be construed as limiting the invention. Various modifications can be made to the embodiments by those skilled in the art without departing from the true spirit and scope of the invention as defined by the appended claims.

What is claimed is:

1. A light guide plate comprising:
   a first light input surface;
   a bottom surface adjacent the first light input surface;
   a light output surface opposite to the bottom surface; and
   a plurality of dots arranged at the bottom surface in a series of adjacent columns parallel to the first light input surface, wherein each column defines a column axis that passes through centers of the dots in that column, a distance between two adjacent column axes increases with increasing distance from the first light input surface, sizes of the dots increase with increasing distance of the columns from the first light input surface, a distance between centers of two adjacent dots in a same column increases with increasing distance from a center of the column to each of two opposite ends of the column, and sizes of the dots in a same column increase with increasing distance from the center of the column to each of the two opposite ends of the column.

2. The light guide plate according to claim 1, wherein a shape of the dots is selected from the group consisting of rectangular, round, elliptical, and polygonal.

3. The light guide plate according to claim 1, wherein a material of the dots is one of printing ink and modified printing ink, and the modified printing ink comprises printing ink matrix material having a plurality of scattering particles uniformly dispersed therein.

4. The light guide plate according to claim 1, wherein the dots are micro-scattering structures etched on the bottom surface.

5. The light guide plate according to claim 1, further comprising a second light input surface opposite to the first light input surface, wherein the bottom surface defines a center axis between the two light input surfaces, a distance between two adjacent column axes increases with increasing distance from the first light input surface to the center axis, a distance between two adjacent column axes increases with increasing distance from the second light input surface to the center axis, sizes of the dots increase with increasing distance of the columns from the first light input surface to the center axis, and sizes of the dots increase with increasing distance of the columns from the second light input surface to the center axis.

6. The light guide plate according to claim 5, wherein the center axis is midway between the first light input surface and the second light input surface.

7. The light guide plate according to claim 1, wherein an area of the dots when viewed from directly below is in the range from about $1 \times 10^{-7}$ square millimeters to about $1 \times 10^{-4}$ square millimeters.

8. The light guide plate according to claim 1, wherein each of dots in each column is offset relative to the adjacent dots in each of the adjacent columns.

9. The light guide plate according to claim 1, wherein the light guide plate can be rectangular or cuneiform sheet.

10. A backlight module comprising:
    a light guide plate comprising:
      a first light input surface;
      a bottom surface adjacent the first light input surface;
      a light output surface opposite to the bottom surface; and
      a plurality of dots arranged on the bottom surface in multiple columns parallel to the first light input surface, wherein each column defines a column axis that passes through centers of the dots in that column, a distance between two adjacent column axes increases with increasing distance from the first light input surface, sizes of the dots increase with increasing distance of the columns from the first light input surface, a distance between centers of two adjacent dots in a same column increases with increasing distance from a center of the column to each of two opposite ends of the column, and sizes of the dots in a same column increase with increasing distance from the center of the column to each of the two opposite ends of the column; and
    a first light source adjacent to the first light input surface.

11. The backlight module according to claim 10, wherein a shape of the dots is selected from the group consisting of rectangular, round, elliptical, and polygonal.

12. The backlight module according to claim 10, wherein a material of the dots is one of printing ink and modified printing ink, and the modified printing ink comprises printing ink matrix material having a plurality of scattering particles uniformly dispersed therein.

13. The backlight module according to claim 10, wherein the dots are micro-scattering structures etched on the bottom surface.

14. The backlight module according to claim 10, further comprising a second light input surface opposite to the first light input surface, and a second light source adjacent to the second light input surface, wherein the bottom surface defines a center axis between the two light input surfaces, a distance between two adjacent column axes increases with increasing distance from the first light input surface to the center axis, and a distance between two adjacent column axes increases with increasing distance from the second light input surface to the center axis, sizes of the dots increase with increasing distance of the columns from the first light input surface to the center axis, and sizes of the dots increase with increasing distance of the columns from the second light input surface to the center axis.

15. The backlight module according to claim 14, wherein the center axis is midway between the first light input surface and the second light input surface.

16. The backlight module according to claim 10, wherein the first light source is at least one item selected from the group consisting of a cold cathode fluorescent lamp and a light emitting diode.

17. The backlight module according to claim 10, wherein an area of the dots when viewed from directly below is in the range from about $1\times10^{-7}$ square millimeters to about $1\times10^{-4}$ square millimeters.

18. The backlight module according to claim 10, wherein each of dots in each column is offset relative to the adjacent dots in each of the adjacent columns.

19. The backlight module according to claim 10, wherein the light guide plate can be rectangular or cuneiform sheet.

* * * * *